(12) United States Patent
Nakai et al.

(10) Patent No.: US 8,570,290 B2
(45) Date of Patent: Oct. 29, 2013

(54) IMAGE DISPLAY DEVICE

(75) Inventors: Jun Nakai, Kanagawa (JP); Takashi Okohira, Kanagawa (JP); Shoichi Ishikawa, Kanagawa (JP); Shunsuke Sasanabe, Kanagawa (JP); Satoshi Tsuchiya, Tokyo (JP)

(73) Assignee: Panasonic Corporation, Osaka (JP)

( * ) Notice: Subject to any disclaimer, the term of this patent is extended or adjusted under 35 U.S.C. 154(b) by 46 days.

(21) Appl. No.: 13/062,065

(22) PCT Filed: Feb. 5, 2010

(86) PCT No.: PCT/JP2010/000698
§ 371 (c)(1),
(2), (4) Date: Mar. 28, 2011

(87) PCT Pub. No.: WO2010/090033
PCT Pub. Date: Aug. 12, 2010

(65) Prior Publication Data
US 2011/0279391 A1   Nov. 17, 2011

(30) Foreign Application Priority Data

Feb. 6, 2009  (JP) ................................ P2009-025744
Dec. 24, 2009  (JP) ................................ P2009-291739

(51) Int. Cl.
*G06F 3/041* (2006.01)
(52) U.S. Cl.
USPC ........................................................ 345/173
(58) Field of Classification Search
USPC ........................................................ 345/173
See application file for complete search history.

(56) References Cited

U.S. PATENT DOCUMENTS

| | | | | |
|---|---|---|---|---|
| 4,952,932 A | * | 8/1990 | Sugino et al. | 341/23 |
| 7,999,872 B2 | * | 8/2011 | Suzuki et al. | 348/333.01 |
| 2005/0017957 A1 | * | 1/2005 | Yi | 345/173 |
| 2009/0174679 A1 | | 7/2009 | Westerman | |
| 2009/0264157 A1 | * | 10/2009 | Hsieh et al. | 455/566 |

FOREIGN PATENT DOCUMENTS

| | | |
|---|---|---|
| JP | 09-044293 A | 2/1997 |
| JP | 2000-039964 A | 2/2000 |
| JP | 2005-128700 A | 5/2005 |
| JP | 2006-244154 A | 9/2006 |
| JP | 2007-028512 A | 2/2007 |
| JP | 2009-025858 A | 2/2009 |
| JP | 2009-217814 A | 9/2009 |

OTHER PUBLICATIONS

International Search Report for International Application No. PCT/JP2010/000698, filed May 18, 2010, Panasonic Corporation.

* cited by examiner

*Primary Examiner* — Quan-Zhen Wang
*Assistant Examiner* — Tony Davis
(74) *Attorney, Agent, or Firm* — RatnerPrestia

(57) ABSTRACT

A vehicle-mounted device includes a storage device, an external input unit, a speaker, an image display unit, a touch panel, a control unit, a DVD/CD drive, a GPS, a vehicle speed sensor, and a gyroscope. The touch panel includes a finger rest area to reduce erroneous operation by a finger or hand of an operator due to vibration of the vehicle or other causes, and perform input intended by the operator even under a vehicle-mounted environment. The operator contacts the finger on the rest area thereby stabilizing his/her inputting hand while contacting the touch panel. As a result, erroneous input can be reduced, and input desired by the operator can be easily performed.

4 Claims, 5 Drawing Sheets

(a)

(b)

(c)

IMAGE DISPLAY DEVICE

This application is a U.S. National Phase Application of PCT International Application PCT/JP2010/000698.

TECHNICAL FIELD

The present invention relates to an image display device, in which a touch panel for performing predetermined input, by contact operation of an operator, is disposed on a front surface of an image display unit for displaying a predetermined content, in particular, to an image display device applied to a vehicle-mounted device such as a vehicle navigation device, or a mobile device frequently operated while being carried.

BACKGROUND ART

A touch panel is generally used for a vehicle-mounted display device or others, and provided on a front surface of a display unit of a liquid crystal display, a plasma display, or the like, such that by contact on the surface thereof, information corresponding to the contacted portion is input as a signal.

In a related display device, an escutcheon is attached onto a touch panel of the image display device to cover the touch panel and its surroundings, and has a function as a design frame (for example, refer to Patent Literature 1).

Patent Literature 1 discloses a display device including a display unit for displaying an image, a touch panel provided on a front surface of the display unit and performing predetermined input by contact operation of a user, an escutcheon provided on an outer peripheral edge of the touch panel to cover the touch panel and its surroundings and has a function as a design frame, an operation invalid area formed from the outer peripheral edge of the touch panel to an inner side of an aperture of the escutcheon wherein contact operation is invalid, and an operation valid area formed in an inner side of the operation invalid area wherein contact operation is valid, wherein erroneous operation caused by introduction of impurity between a film surface of the touch panel and the escutcheon is prevented.

RELATED ART LITERATURE

Patent Literature

[Patent Literature 1] JP-A-2006-244154

SUMMARY OF THE INVENTION

Technical Problem

However, in a related image display device, erroneous operation caused from introduction of impurity between a film surface of a touch panel and an escutcheon can be prevented, while erroneous operation caused from contact by a finger or hand of an operator on an unintended portion of the touch panel due to vibration of a vehicle or other causes cannot be prevented.

The present invention has been made to solve the conventional problem, and its object is to provide a vehicle-mounted device capable of accomplishing input intended by an operator even under a vehicle-mounted environment, by reducing erroneous operation caused by a finger or hand of the operator due to vibration of the vehicle or other causes.

Solution to Problem

The present invention relates to an image display device displaying an image for executing the device's own function in a specific area. The image display device includes an image display unit that displays an image, a touch panel provided on a front surface of the image display unit to detect position information of a position contacted by an operator, and a control unit that performs a control process of the image display device based on the position information of the position contacted by the operator. The control unit sets a predetermined area on the touch panel as a finger rest area. When it is detected that the operator contacts the finger rest area, the control unit waits until the touch panel is subsequently contacted, and when it is detected that a position where the touch panel is subsequently contacted is in the specific area, the control unit executes a function corresponding to the position where the touch panel is subsequently contacted.

According to this configuration, the operator contacts the finger rest area with his/her finger, so that the operator can stabilize his/her inputting hand while contacting the touch panel. As a result, erroneous input can be reduced, and input intended by the operator can be easily performed.

Advantageous of Invention

The present invention can provide an image display device having a touch panel, wherein the touch panel has a finger rest area, and a position of a finger of an operator in contact with the finger rest area is a first contact point, such that while contacting the first contact point, the operator contacts the touch panel except for the finger rest area with his/her finger different from the finger in contact with the finger rest area, so that the operator can stabilize his/her inputting hand while contacting the touch panel, thereby reducing erroneous operation and easily performing input operation intended by the operator.

DESCRIPTION OF EMBODIMENTS

Hereinafter, an image display device of an embodiment of the present invention will be described by using drawings. In the descriptions below, a vehicle-mounted image display device will be described as an example of the image display device. Thus, the vehicle-mounted image display device will be referred to as simply a "vehicle-mounted device" below.

Figure 1:
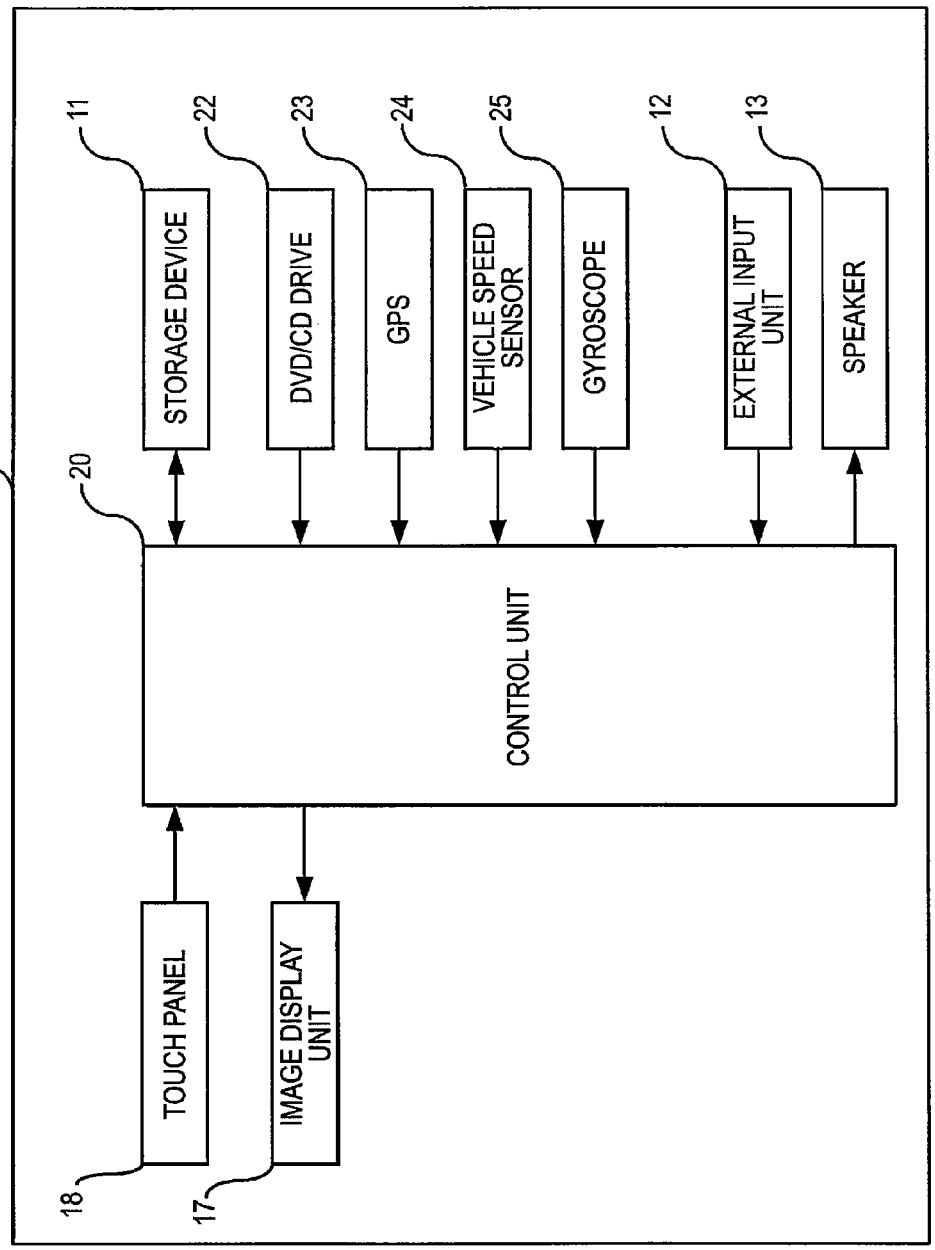
FIG. 1 is a block diagram of a vehicle-mounted device according to an embodiment of the present invention.

FIG. 1 is a block diagram of a vehicle-mounted device according to a first embodiment of the present invention.

The vehicle-mounted device of the first embodiment is a so-called vehicle navigation device having navigation function for performing routing or others, audio reproducing function for performing a reproduction of audio and video recorded in a record medium such as a DVD (Digital Versatile Disc), or other functions. This vehicle navigation device will be described below as an example of the vehicle-mounted device.

In FIG. 1, the vehicle-mounted device 10 includes a storage device 11, an external input unit 12, a speaker 13, an image display unit 17, a touch panel 18, a control unit 20, a DVD/CD drive 22, a GPS receiver 23, a vehicle speed sensor 24, and a gyroscope 25.

The DVD/CD drive 22, the GPS receiver 23, the vehicle speed sensor 24, the gyroscope 25, and the speaker 13 are not required to be integratedly mounted in the vehicle-mounted device 10. The DVD/CD drive 22, the GPS receiver 23, the vehicle speed sensor 24, the gyroscope 25, and the speaker 13 may be configured in the manner that each of them can be electrically connected and separated to the vehicle-mounted device 10.

In the storage device 11, a basic program needed to control the vehicle-mounted device 10 upon activation of the vehicle-mounted device (or in case of emergency or other cases) is stored. Also, various programs and databases such as a program for control of a video display unit or video display, an application program for executing navigation function, or operating application soft used to execute audio reproducing function, or a database for a map for navigation are stored.

Like a general storage device, the storage unit 11 has an area where various programs, data, or others are developed, and an area where an image is developed.

The external input unit 12 is provided to input a signal output from external equipment connectable to the vehicle-mounted device 10. For example, the external input unit 12 is provided to input a video signal or an audio signal obtained by reproducing a media such as a DVD, or a video signal or an audio signal in a digital TV or the like.

The speaker 13 is provided to output a sound effect for informing an operator that the vehicle-mounted device 10 has received operation of the vehicle-mounted device 10, or audio input from external equipment to the external input unit 12, audio or music reproduced, for example, in the DVD/CD drive 22 equipped in the vehicle-mounted device 10, or others.

The image display unit 17 is provided to display an opening screen or a menu screen stored in the storage unit 11, or each of data such as a video input from external equipment to the external input unit 12 on a screen. In the first embodiment, a general liquid crystal display is used.

The image display unit 17 is configured by a liquid crystal panel including a polarizing filter, a liquid crystal, a glass substrate, or others, a component used for a light source of a liquid crystal panel such as a cold cathode tube, LED, and a light guide plate, an electronic component such as IC for controlling various signals to display an image, and a power unit for operating the liquid crystal, the light source, or the electronic component. The power unit may be provided separately from the image display unit 17.

The touch panel 18 is a penetrable panel provided on a surface of the image display unit 17. Input operation to the vehicle-mounted device 10 is performed by contact of an operator on a corresponding area of the touch panel 18.

The control unit 20 includes a micro processor and a peripheral circuit, which is an electric circuit for operating the micro processor. The control unit 20 executes the control programs stored in the storage unit 11 to perform various control processes. The control unit 20 also performs a control process to display image data obtained as a result of the control processes by the control unit 20 on the display unit 17.

Additionally, the control unit 20 acquires a signal from the touch panel 18, calculates a position contacted by a finger of the operator on the touch panel based on the acquired signal, and compares the calculated position information with information of a touch area of the touch panel 18 stored in the storage device 11. The control unit 20 also performs function defined in a button, a menu, a switch, or others pre-associated with the touch area corresponding to the position contacted by the finger of the operator.

The DVD/CD drive 22 is provided to reproduce a disc, in which an audio source (or audio data) or a video source (video data) is stored.

The GPS receiver 23 is provided to receive a signal from a GPS satellite. The vehicle speed sensor 24 is provided to receive a vehicle speed signal from a vehicle, and determine a movement speed of a vehicle.

The gyroscope 25 is provided to detect an amount of rotation or an amount of variation in up and down directions, or acceleration of a vehicle.

The operation of the vehicle-mounted device configured as described above will be described, by using FIGS. 2 to 5.

Figure 3:
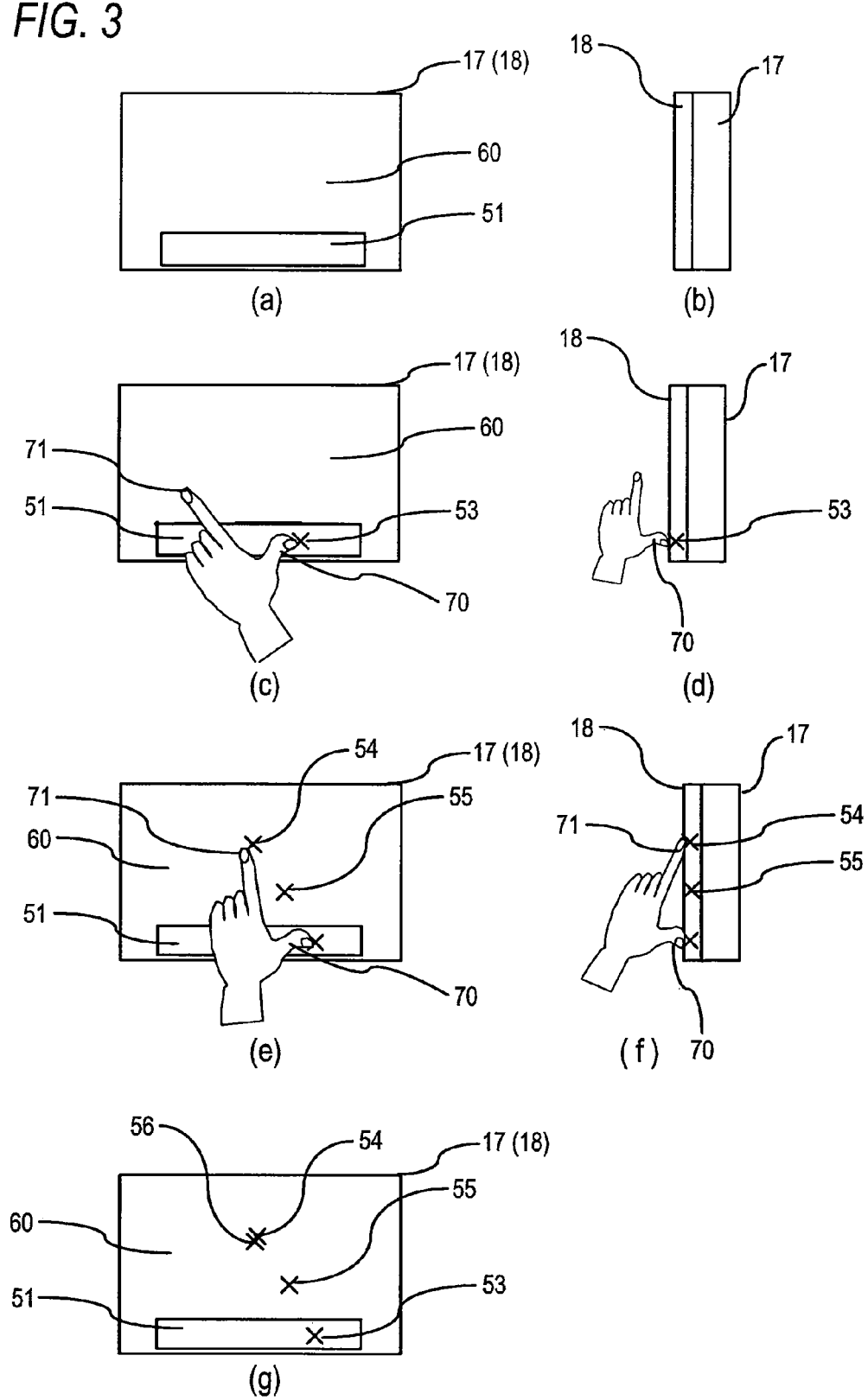
FIG. 3 is a schematic view for explanation of operation of a vehicle-mounted device according to the embodiment of the present invention, in which FIG. 3 (*a*), FIG. 3 (*c*), FIG. 3 (*e*), and FIG. 3 (*g*) are front views of an image display unit, and FIG. 3 (*b*), FIG. 3 (*d*), and FIG. 3 (*f*) are views when viewed from the side of the image display unit.

The outline of the operation of the vehicle-mounted device 10 in the first embodiment will be first described below by using FIG. 3. FIG. 3 is a general view to explain operation of the vehicle-mounted device of the first embodiment. FIG. 3(a) is a view when the vehicle-mounted device 10 is viewed at the front thereof. In the first embodiment, when the vehicle-mounted device 10 is viewed at the front thereof as shown in FIG. 3(a), the image display unit 17 and the touch panel 18 have almost the same size. However, the image display unit 17 and the touch panel 18 do not need to be the same in size, which will be described later.

In FIG. 3(a), the inside of a frame line indicating the image display unit 17 (or touch panel 18) is a display area, on which various images are displayed. An outer periphery of each of the inside of the image display unit 17 and the inside of the touch panel 18 is referred to as an outer peripheral edge.

In FIG. 3(a), a predetermined area indicated by the reference numeral 51 is set as the finger rest area. A specific area, which a button, an icon, or others are displayed, is set on an area except for the finger rest area 51 within the display area.

The button or the icon, and a character or a figure presented in the button or the icon, and function in the navigation function, the disc reproducing function, or others in the vehicle-mounted device 10 are set in advance in correspondence (or being defined) with one another. A user contacts an area, on which a button or an icon is displayed, with his/her finger, to command the vehicle-mounted device 10 to execute function corresponding (or defined in) to the button or the icon.

The specific area is not limited to an area, on which a button or an icon is displayed. For example, if the vehicle-mounted device 10 executes vehicle navigation function, i.e., if a map screen is displayed on the display area, like general vehicle navigation function, a finger of the operator contacts any point displayed on the display area except for the finger rest area, whereby update operation for displaying a surrounding area map screen, in which the point is a center point of the image display unit 17 (or a desired point around the center point), is performed. Since the touch panel 18 is made of transparent material, in the state shown in FIG. 3(a), the user can see a map image displayed on the whole display area.

When a finger of the operator contacts the finger rest area 51 on the touch panel 18, the control unit 20 detects (recognizes) position information of the point contacted by the operator on the touch panel 18, and stores the position information in the storage device 11. Subsequently, while the finger contacts the touch panel 18, the control unit 20 is in the waiting state, until subsequent input operation is conducted (until it is detected that the touch panel 18 is contacted next time). The waiting state means the state before the operator contacts the finger rest area 51, or the state that operation of function is maintained.

When there is subsequent input operation during the waiting state, the control unit 20 performs processes for calculating a contact position in the "subsequent input operation" and executing function corresponding to the contact position.

In other words, for the vehicle-mounted device 10 shown in FIG. 3(a), in order to stabilize a relative position between the touch panel 18 and the finger (hand) of the operator, the operator first puts his/her thumb 70 (makes his/her thumb 70 in contact with) on the finger rest area 51 of the touch panel 18.

The finger rest area 51 is a set area, in which when a finger of the operator contacts a corresponding portion within the finger rest area 51 on the touch panel 18, the touch panel 18 detects a position of the contact point, while the control unit 20 does not execute any function of the vehicle-mounted device 10.

FIG. 3(c) shows this state. FIG. 3(c) shows the state that the thumb 70 of the operator is in contact with the finger rest area 51 of the touch panel 18, which is viewed at the front of the vehicle-mounted device 10. In this state, the forefinger 71 of the operator is not in contact with the touch panel 18.

Irrespective of the operation of the vehicle-mounted device 10, the operator can put his/her thumb on the touch panel 18. Accordingly, the finger or hand of the operator to the touch panel 18 is stabilized.

Operation of command input for operating the function of the vehicle-mounted device 10 in an area on the touch panel 18 except for the finger rest area 51 is the same as operation of a general touch panel, and performed by touch (contact or press) of display areas such as a plurality of buttons or icons displayed on a display screen.

FIG. 3(e) shows this state. FIG. 3(e) shows the state that the thumb 70 of the operator is in contact with the finger rest area 51 of the touch panel 18, and the forefinger 71 of the operator is in contact with a desired button (or icon), which is viewed at the front of the vehicle-mounted device 10.

Since the operator can perform the operation as described above, according to the vehicle-mounted device of the first embodiment, the operator is not adversely affected by vibration of the vehicle or others thereby not causing erroneous operation of the vehicle-mounted device. In other words, input intended and desired by the operator can be performed in the state that the hand (finger) of the operator is stabilized.

However, a touch panel performing one-point detection detects a split ratio of resistance formed on the touch panel. Thus, in case of contact on two points, the split ratio cannot be exactly detected so that position information of the two points cannot be detected. Accordingly, the calculation method described below is used.

The vehicle-mounted device 10 recognizes (detects) a position (contact point) when the thumb 70 of the operator contacts the finger rest area 51. Subsequently, when the forefinger 71 of the operator contacts a desired position, the vehicle-mounted device 10 recognizes (detects) a position (contact point) between the thumb 70 and the forefinger 71. Based on the recognized two contact points, the vehicle-mounted device 10 performs calculation processes, which will be described below, and specifies the contact point contacted by the forefinger 71 of the operator on the touch panel 18.

In the descriptions above, the contact point initially contacted by the operator on the touch panel 18 (the position initially contacted by the thumb 70 in the case described above) is referred to as a first contact point. Position information presenting (indicating) the first contact point is referred to as first position information. A position contacted by the operator on the touch panel 18 after the contact on the first contact point (the position contacted by the forefinger 71 in the case described above) is referred to as a second contact point. Position information of a point existing between the first contact point and the second contact point and detected by the touch panel 18 when the operator contacts the first contact point and the second contact point at the same time is referred to as third position information. Position information of the point contacted by the operator on the touch panel 18 after the contact on the first contact point and obtained from the calculation processes by the control unit 20 is referred to as fourth position information. On this basis, details will be described below.

Meanwhile, the finger of the operator for contacting the first contact point is not limited to the thumb, and may be one of the other fingers such as the forefinger or the little finger. The finger of the operator for contacting the second contact point also is not limited to the forefinger.

Figure 4:
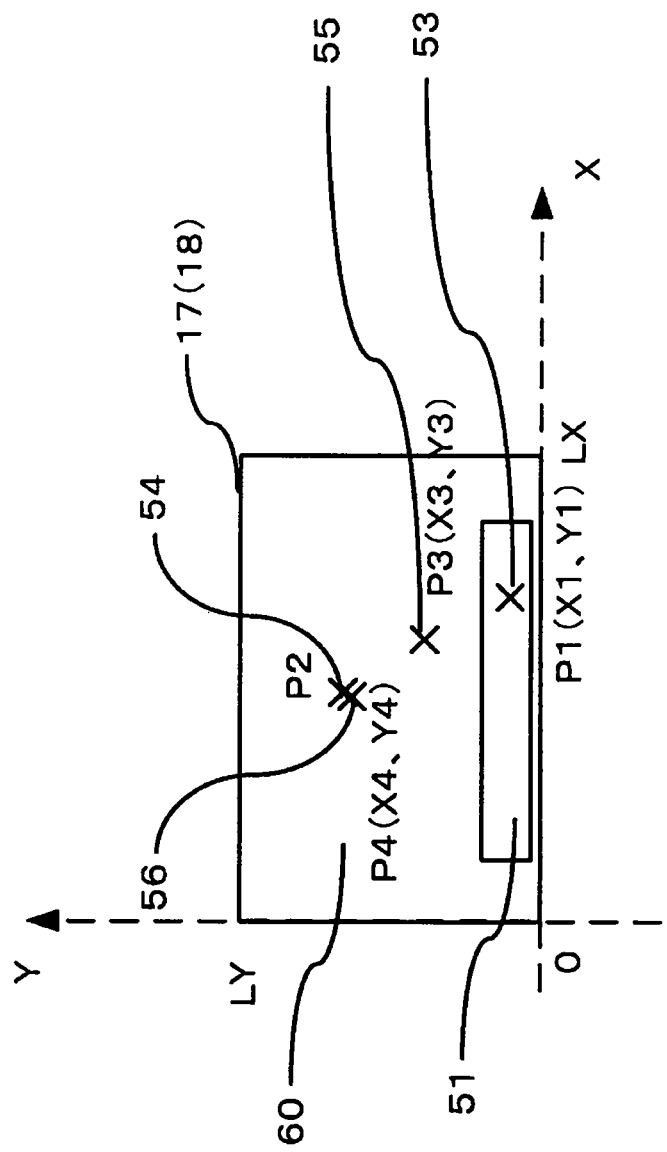
FIG. 4 is an explanation view of a method of calculating fourth position information, in a vehicle-mounted device of the embodiment of the present invention.

FIG. 4 explains one example for a method of calculating the fourth position information. Based on the angel in the left bottom side of the touch panel 18 toward the paper surface of FIG. 4, the horizontal direction is an X axis, and the vertical direction is a Y axis.

In presenting the first to fourth position information by using coordinates, an X coordinate of each of the position information has a smaller value than a maximum value LX of the X axis direction of the touch panel 18. A Y coordinate of each of the position information has a smaller value than a maximum value LY of the Y axis direction of the touch panel 18.

A position indicated by the first contact point 53 within the finger rest area 51 is P1, and position information of the first contact point 53 is P1 (X1, Y1). A position of the second contact point 54 contacted by a different finger from the finger in contact with the first contact point 53 is P2, and position information of the second contact point 54 is P2 (X2, Y2). When the operator contacts the second contact point 54 while contacting the first contact point 53, a point recognizing the contact on the touch panel 18 is P3, and position information thereof is P3 (X3, Y3). The position information P3 is a value for calculating the fourth position information.

However, like a general detection method of a touch panel performing one-point detection, in case of the point recognizing the contact on the touch panel 18 when the operator contacts the second contact point 54 while contacting the first contact point 53, the operator is not actually in contact with the touch panel 18.

In the touch panel performing one-point detection, when the operator simultaneously contacts two points on the touch panel, the touch panel recognizes that a point positioned between the simultaneously contacted two points has been contacted.

For convenience, this performance has been expressed in the above descriptions as the point recognizing the contact on the touch panel 18 when the operator contacts the second contact point 54 while contacting the first contact point 53. This "recognizing point" will be referred to as a third contact point below. Although a position indicated by the fourth position information will be occasionally referred to as a fourth contact point, the intention is the same as the third contact point.

If the present invention is applied to a touch panel performing one-point detection, and if the first contact point 53 exists within the finger rest area 51, the control unit 20 calculates the fourth position information P4 (X4, Y4), based on the position information P1 (X1, Y1) of the first contact point 53, and the position information P3 (X3, Y3) of the third contact point 55 detected by the touch panel 18 when the operator contacts the touch panel 18 with a different finger from the finger used for contacting the first contact point 53, while contacting the first contact point 53, after detection of the first contact point 53, so that function (e.g., CD function, radio function, or scroll function on a map screen for navigation) assigned to the fourth position information is executed by processes of the control unit 20.

A value X4 of an X coordinate of the fourth position information is calculated by dividing a value X1 of an X coordinate of the first position information by a value X3 of an X coordinate of the third position information, subtracting the divided value from 1, multiplying the subtracted value by a maximum value LX of X, and adding the value X1 of the X coordinate of the first position information to the multiplied value.

A value Y4 of a Y coordinate of the fourth position information is calculated by dividing a value Y1 of a Y coordinate of the first position information by a value Y3 of a Y coordinate of the third position information, subtracting the divided value from 1, multiplying the subtracted value by a maximum value LY of Y, and adding the value Y1 of the Y coordinate of the first position information to the multiplied value.

The calculation formula of the fourth position information P4 (X4, Y4) is as follows:

$$X4 = X1 + (1 - X1/X3) \times LX$$

$$Y4 = Y1 + (1 - Y1/Y3) \times LY$$

If this method is used, the touch panel performing one-point detection also can detect two points consecutively contacted by the operator, so that the degree of freedom for an input method increases.

<Another Method for Calculating the Fourth Position Information>

In another calculation formula for calculating the fourth position information based on the first position information and the third position information, different calculations will be described below by using FIG. 4.

Each of the position information has information of coordinates (X, Y) on the touch panel. Calculation of the fourth position information P4 (X4, Y4) based on the first position information and the third position information uses the XY coordinates of the first position information and the third position information, such that X 4 is calculated by subtracting a value X1 of an X coordinate of the first position information from a value X3 of an X coordinate of the third position information and adding the subtracted value to the value X3 of the X coordinate of the third position information, and Y4 is calculated by subtracting a value Y1 of a Y coordinate of the first position information from a value Y3 of a Y coordinate of the third position information and adding the subtracted value to the value Y3 of the Y coordinate of the third position information. As a result, the fourth position information P4 (X4, Y4) can be calculated.

Like this, any calculation formula can be used if it can calculate the first contact point 53, and the fourth position information P4 (X4, Y4) when the operator contacts the second contact point 54 with his/her forefinger 71 different from the thumb 70 used for contacting the first contact point 53, while contacting the first contact point 53.

Hereinafter, the operation of the vehicle-mounted device 10 in case of using a touch panel performing one-point detection will be described in detail.

Figure 2:
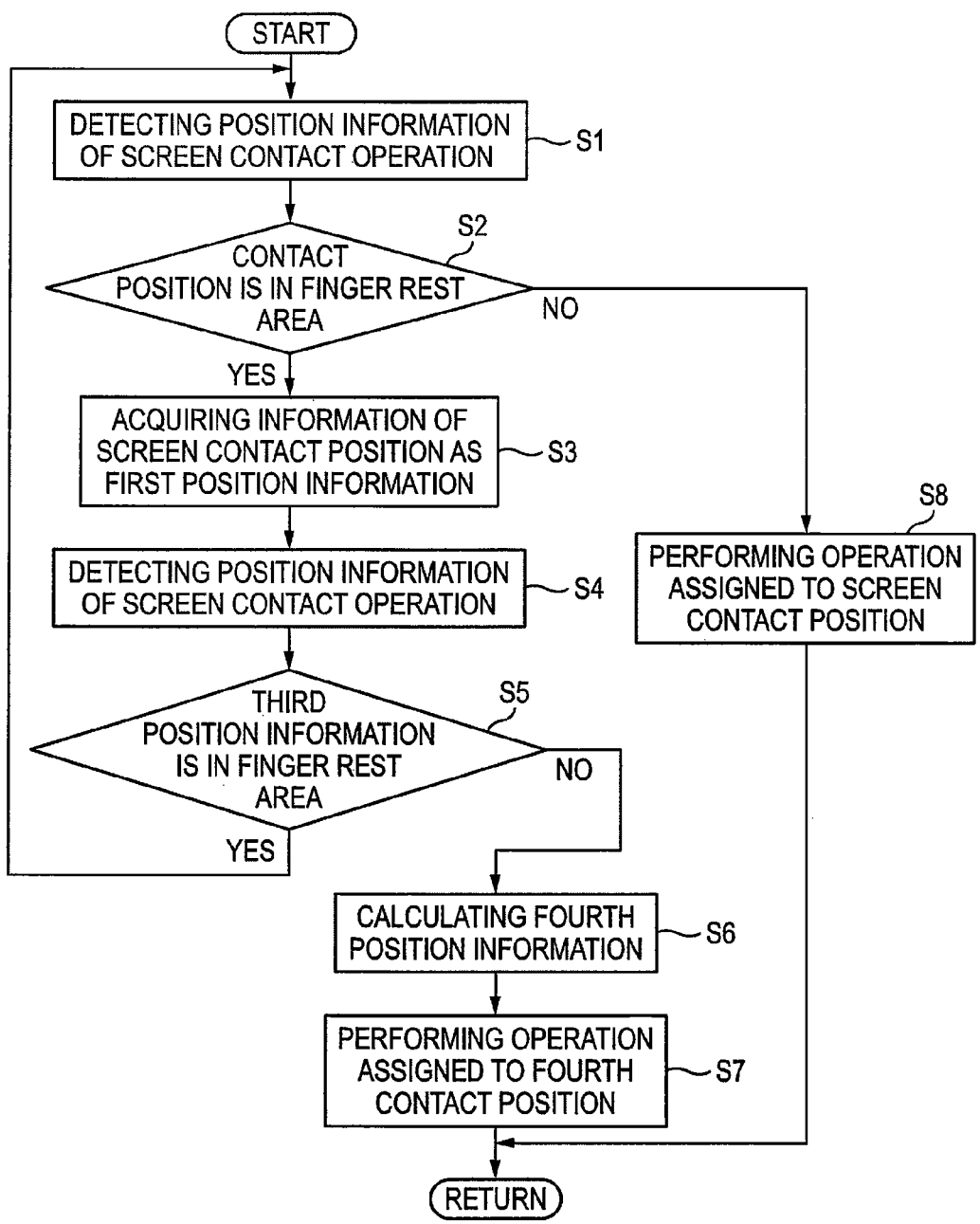
FIG. 2 is a flowchart for explanation of operation of a vehicle-mounted device according to the embodiment of the present invention.

FIG. 2 shows a flowchart for processes performed by the vehicle-mounted device 10, when an operator performs input operation by contacting the touch panel 10, in a vehicle-mounted device of an embodiment of the present invention. FIG. 3(a) is a view when the image display unit 17 and the touch panel 18 are viewed at the front thereof. The area of the image display unit 17 is divided into the finger rest area 51 and areas 60 except for the finger rest area.

The finger rest area 51 is merely an area for stabilizing a relative position between the finger (hand) of the operator, for example, the thumb 70 in contact with the finger rest area 51, and the touch panel. Thus, the finger rest area is an area, by which contact on the touch panel 18 maintains, or an area, to which execution of function equipped in the vehicle-mounted device 10 is not assigned, and in which position information is acquired when operation by the operator is performed. The area 60 except for the finger reset area is an area on the touch panel 18 excluding the finger rest area 51.

FIG. 3(b) shows the state when the state of FIG. 3(a) is viewed from the side. In the vehicle-mounted device 10, the touch panel 18 and the image display unit 17 are arranged in the order that they should be contacted by the thumb 70 of the operator.

In FIG. 2, the initial state is the state of wait for input to the touch panel 18, and corresponds to the state that there is no operation by the operator to the touch panel 18, as shown in FIG. 3(a) (the START state in FIG. 2).

When the operator selects to contact the area 60 except for the finger rest area on the image display unit 17, on which a buttons, a switch, a menu, or others are displayed, in order to stabilize the relative position of the touch panel 18 and the finger (hand) of the operator to the vehicle-mounted device 10 vibrating due to vibration of the vehicle, the operator first contacts the finger rest area 51, for example, with his/her thumb, thereby stabilizing operation by the hand (or a different finger) of the operator to the touch panel 18.

FIGS. 3(c) and 3(d) show this state. FIG. 3(c) shows the state that the thumb 70 of the operator is in contact with the finger rest area 51 of the touch panel 18. FIG. 3(d) shows the state when the state of FIG. 3(c) is viewed from the side.

In this state, the touch panel 18 detects position information of the position where the contact operation has been conducted, on the display screen (S1). The position when the touch panel 18 detects the contact operation by the operator for the first time after the state of wait for input is the first contact point.

The control unit 20 determines whether or not the first contact point 53 is within the finger rest area 51 (S2). If it is determined that the contact point of the thumb 70 of the operator is within the finger rest area, the control unit 20 acquires position information of the first contact point 53 as the first position information (S3), and stores the information of the first contact point in the storage device 11.

Subsequently, in order to execute the function of the vehicle-mounted device 10, the operator contacts the display area such as a menu or a button defining function desired to be executed. In that case, the operator contacts the display area such as a menus or a button with a different finger from the thumb 70 while contacting the finger rest area 51 with the thumb 70.

FIG. 3(e) shows the state that the operator contacts the touch panel 18 with his/her forefinger 71, and not his/her thumb 70, while contacting the finger rest area 51 with his/her thumb 70. FIG. 3(f) shows the state when the state of FIG. 3(e)

is viewed from the side. The operator is in contact with the touch panel 18 with his/her thumb 70 and forefinger 71.

To mean second contact after contact by the thumb 70 on the touch panel 18, the point contacted by the forefinger 71 on the touch panel 18 is referred to as a second contact point 54. When the second contact point 54 is contacted by the forefinger 71, a point between the first contact point and the second contact point, e.g., a position 55 in FIG. 3(*e*) is detected by the touch panel 18. This position is referred to as a third position. When the third position is detected by the touch panel 18, the control unit 20 obtains third position information.

Next, the control unit 20 determines whether or not the position 55 presented in the third position information exists within the finger rest area 51 (S5).

In S5, if position information of the position 55 presented in the third position information is within the areas 60 except for the finger rest area 51, S6 is performed.

If it is determined in S5 that the position 55 presented in the third position information is within the areas 60 except for the finger rest area 51, the control unit 20 calculates the fourth position information through calculation processes, which will be described in detail below, based on the first position information and the third position information (S6).

If it is determined in S5 that position information of the position 55 presented in the third position information is within the finger rest area 51, the control unit 20 invalidates the operation from the operator and returns to the START state prior to S1.

The reason for this process is that in the event that the operator presses the finger rest area 51, and presses the finger rest area 51 again after the finger of the operator is momentarily apart from the finger rest area 51 due to vibration from the outside or other causes, the control unit 20 recognizes the position contacted again on the finger rest area 51 as the third position information.

However, it is possible to add a step for detecting that the finger of the operator is apart from the finger rest area 51 to the process flow to perform the follow-up processes.

When the fourth position information is calculated in S6, the control unit 20 performs a process for operating function assigned to the position indicated by the fourth position information on the image display unit 17 (S7).

FIG. 3(*g*) shows a position 56 presented by the fourth position information from the position 53 presented by the first position information.

There may be a case where the position indicated by the fourth position information on the touch panel 18 is not the same as the position information indicated by the second position information. However, the difference is extremely insignificant and does not cause any problem in actual utilization.

In S2, if the first contact point 53 is not within the finger rest area 51, S8 is performed, so that operation assigned to the contact point by the finger of the operator on the screen is performed. Accordingly, even in the case where the operator wants to perform operation by directly contacting the screen without contacting the finger rest area 51 with his/her finger, the operation intended by the operator can be reliably performed.

Next, the disposition of the finger rest area 51, in particular, an example for variations of the disposition will be described by using FIG. 5.

Figure 5:
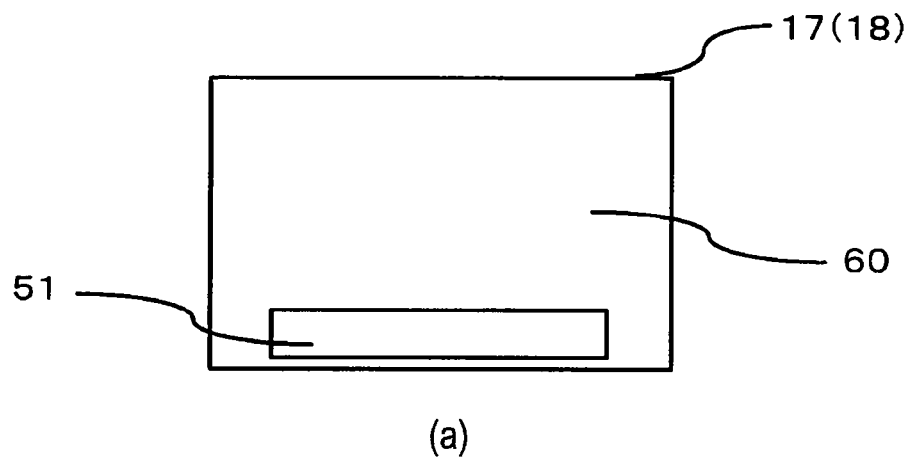
FIGS. 5(*a*) to 5(*c*) show examples for setting a finger rest area, in a vehicle-mounted device according to the embodiment of the present invention.
Figure 5:
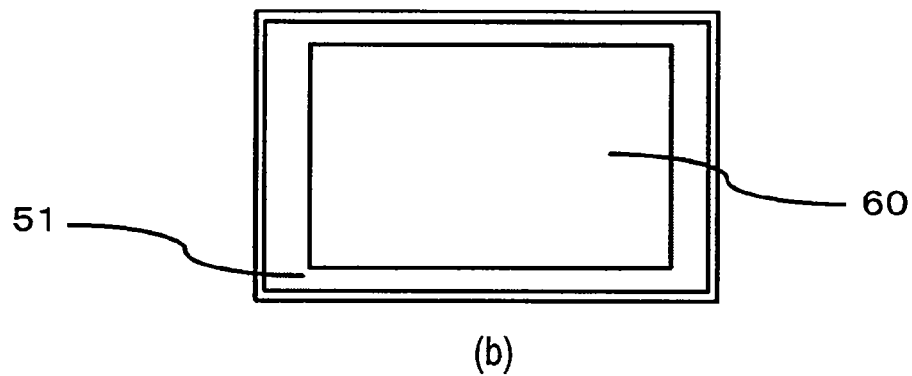
Figure 5:
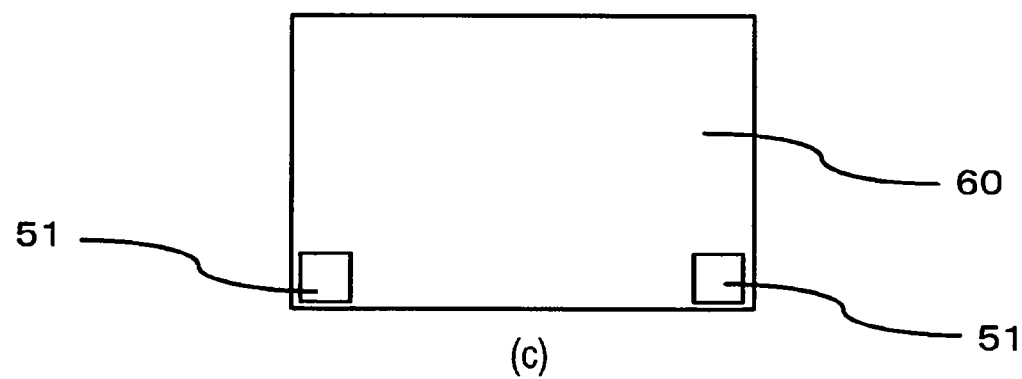

FIG. 5 shows a set example as one example of the disposition of the finger rest area 51. FIG. 5(*a*) shows an example wherein the finger rest area 51 is provided on a portion of the outer peripheral edge of the touch panel 18. With respect to a portion of the outer peripheral edge of the touch panel 18, as shown in FIG. 5(*a*), the finger rest area 51 is provided on a portion of the bottom side forming the outer peripheral edge of the touch panel 18.

Assuming that upon operation, the operator naturally puts his/her hand on the touch panel 18, his/her thumb naturally reaches the bottom side of the touch panel. Accordingly, by providing the finger rest area 51 on the bottom side of the touch panel 18, it is possible for the operator to naturally put his/her thumb on the finger rest area 51, thereby stabilizing the hand (finger) for operation to the touch panel 18.

With respect to a portion of the outer peripheral edge of the touch panel 18, although not illustrated, the finger rest area 51 may be provided on a portion of the top side forming the outer peripheral edge of the touch panel 18. In this case, it is possible for the operator to put his/her forefinger or middle finger on the finger rest area 51 thereby stabilizing his/her hand (finger) for operation to the touch panel 18.

If the finger rest area 51 is provided on a portion of the outer peripheral edge of the touch panel 18, display portions hidden due to the finger in contact with the finger rest area 51 are reduced. Accordingly, visibility of the image display area to the operator is not significantly deteriorated.

FIG. 5(*b*) shows the case where the finger rest area 51 is provided on the entire outer peripheral edge of the touch panel 18. Since the finger rest area 51 is provided on the entire outer peripheral edge of the touch panel 18, the operator can select a preferred position of the display areas in all directions as the finger rest area.

The utility in stabilizing the finger on the upper side or the lower side of the touch panel 19 is the same as described by using FIG. 5(*a*). However, as shown in FIG. 5(*b*), if the finger rest area 51 is provided on the left and right sides of the outer peripheral edge of the touch panel 18, and if the operator is positioned at the right side of the vehicle-mounted device 10, assuming that the operator stretches his/her hand to the touch panel 18, the middle finger of the operator is first naturally stretched toward the left side of the vehicle-mounted device 10. Accordingly, it is possible to stabilize the middle finger or forefinger of the operator for operation on the area of the left side within the finger rest area 51. And, the operator can contact the second contact point with his/her thumb. This is also possible in the case where the operator is positioned at the left side of the vehicle-mounted device 10.

In general, in most cases, the vehicle-mounted device 10 is provided on the horizontal side of the operator (between the driver seat and the passenger seat). Accordingly, if the above disposition example is applied to the vehicle-mounted device 10, it will increase convenience and utility.

FIG. 5(*c*) shows one example wherein two finger rest areas 51 are partially provided on a portion of the outer peripheral edge of the touch panel 18.

In case of this example, in order to secure the original display area in a relatively larger size, the finger rest areas 51 are partially provided. Additionally, however, it is possible to accomplish conventional operation, which cannot be performed during driving, by allowing the control unit 20 to discriminate operation by a driver when the finger rest area in the right side is contacted, and operation by a passenger when the finger rest area in the left side is contacted, and separately set the operations.

As described above, in the present invention, various variations for the disposition of the finger rest area 51 are used.

In the embodiment described above, the finger rest area 51 is provided on the touch panel 18 to be disposed within the display areas of the image display unit 17. However, the finger rest area 51 may be provided on the touch panel 18 to be disposed out of the display areas.

In this case, by using the present invention, an escutcheon used in a conventional image display device is unnecessary. Accordingly, a space required to provide a conventional escutcheon can be used as a space to provide the finger rest area 51. Thus, for the image display unit 17, a liquid crystal panel in a conventional size can be used.

In a conventional image display device, a hard key (so-called mechanical switch such as a button type switch) or a component for detecting a touch position on a touch panel is provided in an escutcheon. Thus, there has been a problem in design because the escutcheon is projected from the surface of the touch panel, thereby loosing refinement. However, as described above, the finger rest area 51 is integreatedly provided on the touch panel 18 to be disposed out of the display areas, so that the front surface of the image display device is not partially projected and can be flat on one surface. As a result, refined design can be accomplished.

If the finger rest area 51 is provided on the touch panel 18 to be disposed out of the display areas, the finger rest area is provided out of the display area, and furthermore, indication of a button frequently used by the operator may be printed on the touch panel 18. As a result, operability equal to the case where an escutcheon is provided in addition to the components described above can be secured.

A position, size, and the number of the finger rest areas 51 can be randomly set. The vehicle-mounted device 10 may be configured in the manner that the pre-determined position, size, or number is stored in the storage unit 11, or a plurality of set values for the position, size, or number are stored in the storage unit 11 to allow the control unit 20 to determine each of the set values in accordance with operation by the operator.

The drawing shows an example wherein the finger rest area 51 is displayed on the display screen so that it can be clearly seen by the operator. However, when the vehicle-mounted device 10 performs, for example, navigation function, there is a case where map information desired by a user to check is hidden by the display of the finger rest area 51. Thus, in order to facilitate the user's seeing of desired contents to be displayed such as map information, it is possible to display the boundary between the finger rest area 51 and the areas 60 except for the finger rest area 51 by surrounding only the boundary by means of a line or the like.

In order to prevent characters or others displayed on the display screen from being hidden, the finger rest area 51 may be configured in the manner that it is not seen, and display of the boundary also is not performed.

In the embodiment described above, the vehicle-mounted device has been described as an embodiment of the present invention. However, even if the present invention is applied to mobile devices, which have been increasingly used in the recent years, improvement of the operability is accomplished.

There is a case where a mobile device is operated by an operator during walking. While the operator is walking, a relative position of the touch panel and the finger of the operator is not stabilized due to vibration caused by walking. Thus, if the present invention is applied to the mobile device to provide the finger rest area on the touch panel, the finger of the operator is stabilized thereby resolving the problem.

In any case of the vehicle-mounted device or the mobile device, in a conventional image display device having a touch panel, it has been common that an escutcheon is provided on an outer peripheral edge of the touch panel to cover the touch panel and its surroundings and function as a design frame. This disposition has been adopted because a component necessary to detect a position contacted by the operator on the touch panel should be provided on the outer peripheral edge of the touch panel. In addition, it has been common that a hard key (so-called mechanical switch such as a button-type switch) is provided on the escutcheon by using the escutcheon.

In the case of operating the image display device, in which an escutcheon is provided, if the operator puts his/her finger on the escutcheon in order to stabilize the relative position of the finger of the operator and the touch panel, there is a high possibility that the operator erroneously operates the hard key provided on the escutcheon due to impact of vibration of a vehicle or other causes.

However, if the present invention is applied to the image display device having the escutcheon, such erroneous operation can be prevented.

As a capacitance-type touch panel and others have been recently developed, a chance to use an image display device, which does not require an escutcheon, is increasing. In consideration of designs such as beauty of the appearance of a device itself, use of an image display device, in which an escutcheon is provided, is increasing.

By applying the present invention to an image display, in which an escutcheon is not provided, an image display device having excellent design and operability can be accomplished. The present invention can also be applied to a vehicle-mounted audio having an image display unit, in addition to a vehicle-mounted navigation device.

As described above, according to the image display device of the present invention, the finger rest area is disposed only to recognize a contact position when the operator contacts the touch panel provided on the image display device, so that the operator can stabilize his/her hand to the touch panel while contacting the touch panel. As a result, erroneous operation is reduced, and input operation intended by the operator can be easily performed.

In that case, if a touch panel performing one-point detection is used for the image display device of the present invention, input operation desired by the operator is reliably performed by executing the calculation method described above. If a touch panel performing two-point detection is used for the image display device of the present invention, the calculation process does not need to be executed, so that the burden of the control unit of the image display device to perform the calculation process can be reduced.

While the present invention has been described in detail or by reference to particular embodiments, it is apparent to one skilled in the art that various modifications and changes can be added without departing from the spirit and the scope of the present invention.

The present application is based on the Japanese patent application (Japanese Patent Application No. 2009-025744) filed on Feb. 6, 2009 and the Japanese patent application (Japanese Patent Application No. 2009-291739) filed on Dec. 24, 2009, the contents of which are herein incorporated by reference.

INDUSTRIAL APPLICABILITY

As described above, according to the image display device of the present invention, the finger rest area is provided on the touch panel provided on the image display device. A position of the finger of the operator in contact with the finger rest area is a first contact point. The operator contacts an area on the touch panel except for the finger rest area with his/her finger different from the finger in contact with the finger rest area while contacting the first contact point, so that the operator can stabilize his/her finger for input operation to the touch panel while contacting the touch panel. Accordingly, erroneous input is reduced, and input intended by the operator can be easily performed. The present invention is useful for an image display device, in which a touch panel is disposed, and can be applied to a vehicle-mounted device such as a navigation device, and others.

REFERENCE SIGNS LIST 10 vehicle-mounted device
11 storage device
12 external input unit
13 speaker
17 image display unit
18 touch panel
20 control unit
22 DVD/CD drive
23 GPS
24 vehicle speed sensor
25 gyroscope
51 finger rest area
53 first contact point
54 second contact point
55 third contact point
56 fourth contact point
60 areas except for the finger rest area
70 thumb
71 forefinger

The invention claimed is:

1. An image display device displaying an image for executing the device's own function in a specific area, comprising
an image display unit that displays an image;
a touch panel provided on a front surface of the image display unit to detect position information of a position contacted by an operator; and
a control unit that performs a control process of the image display device based on the position information of the position contacted by the operator,
wherein the control unit is configured to set a predetermined area on the touch panel as a finger rest area; and
wherein when the control unit detects a first position in the finger rest area where the touch panel is contacted, the control unit waits until the touch panel is subsequently contacted, and when the touch panel is a) subsequently contacted in a second area outside of the finger rest area, and b) simultaneously contacted in the first position in the finger rest area and a further position in said second area, the control unit executes a function based on the first position and the further position in said second area where the touch panel was subsequently contacted wherein said function is executed after both the first position in the finger rest area is contacted and simultaneously the further position in the second area is contacted.

2. The image display device according to claim 1, wherein the finger rest area is set on an entire outer peripheral edge of the touch panel.

3. The image display device according to claim 1, wherein the finger rest area is set on a bottom side of an outer peripheral edge of the touch panel.

4. The image display device according to claim 1, wherein a plurality of finger rest areas are set on an outer peripheral edge of the touch panel.

* * * * *